Patented June 17, 1941

2,245,971

UNITED STATES PATENT OFFICE 2,245,971

AZO DYESTUFFS

Friedrich Felix and Wilhelm Huber, Basel, Switzerland, assignors to the firm of Society of Chemical Industry in Basle, Basel, Switzerland No Drawing. Application February 1, 1938, Serial No. 188,189. In Switzerland February 3, 1937

11 Claims. (Cl. 260—205)

This invention relates to the manufacture of azo-dyestuffs by introducing a —S—SO₃H group linked to an alkyl radical into azo-dyestuffs. Such dyestuffs have the general formula

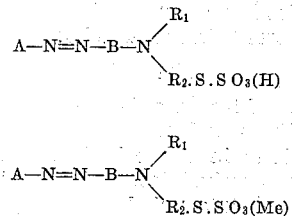

wherein A and B stand for nuclei of the benzene or naphthalene series, R₁ stands for hydrogen or an alkyl radical which may be substituted, and R₂ stands for an alkyl which may be substituted by hydroxyl groups. These dyestuffs may be free acids or they may be in the form of their salts. They are yellow, orange, red and dark powders which dissolve in water to yellow, to orange, to red, to brown, to violet and to blue solutions and dye textiles the same tints.

The general method of introducing the —S—SO₃H group or the —S—SO₃—Me group, wherein Me stands for a metal, consists in treating with a salt of thiosulfuric acid a dyestuff which contains a grouping capable of being exchanged for the thiosulfuric acid residue. In the case of dyestuffs which do not contain a grouping capable of being so exchanged, this grouping may be first introduced and the product may then be treated with a salt of thiosulfuric acid. It is also possible to introduce into the dyestuff or intermediate product the thiosulfuric acid residue through the agency of an atom-grouping which contains the thiosulfuric acid residue.

Another procedure consists in causing a suitable intermediate product to react with the thiosulfuric acid salt and subsequently to convert the intermediate product so treated into the dyestuff. Especially suitable residues which render possible the introduction of the thiosulfuric acid group are, for example, inorganic and organic acid residues, particularly halides and esters of organic acids and of inorganic acids having organic oxy-compounds. The groups capable of exchange are to be linked to an alkyl radical. Of the dyestuffs and intermediate products which come into question those are, therefore, especially suitable which contain externally united halogen atoms or other of the aforesaid groupings externally united. Thus, for example, azo-dyestuffs which contain aliphatically united reactive groupings may be converted into the new compounds by reaction with salts of thiosulfuric acid.

Particularly suitable intermediate products for making azo-dyestuffs are the products of the reaction of ω-halogenalkylarylamines, such ω-halogenalkylaminobenzenes, with salts of thiosulfuric acid. If such products contain a free amino-group, they may be converted into dyestuffs by known methods, namely diazotization and coupling with any desired coupling components. If, for example, the para- or ortho-position of an amino- or hydroxy-group is not substituted, or contains substituents capable of displacement by the diazo-residue, the group will serve as a coupling component and may be caused to react with any desired diazo-compound.

As coupling components which may be caused to react with a desired diazo-compound there are suitable, therefore, compounds of the general formula

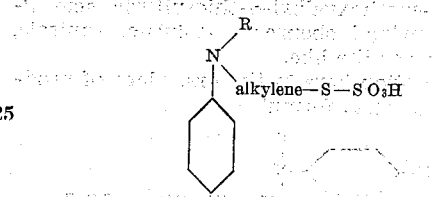

in which R is hydrogen, alkyl, oxalkyl, poly-oxalkyl, their ethers and esters, with organic and inorganic acids. These alkyl residues may contain oxygen bridges and may contain as further substituents CN-groups, halogen atoms, sulfonic groups or the like. Furthermore, this residue may also carry the S—SO₃H-group. The alkyl-group which carries the S—SO₃H residue may also contain substituents, for instance OH, O-alkyl, halogen or the like. Among these groups are ω-thiosulfuric acid ethylaminobenzene which may contain substituents in the nucleus, for instance 1-N-ω-thiosulfuric acid ethylamino-3-methyl- or -3-halogenbenzene, 1-N-ω-thiosulfuric acid ethylamino-2-methoxybenzene, 1-N-ω-thiosulfuric acid ethylamino-2-methoxy-5-methyl- or -2.5-alkoxybenzene. Further, 1-N-ω-thiosulfuric acid ethylamino-2-alkoxy-5-acylaminobenzene. There may also be used products such as alkyl ω-thiosulfuric acid alkylaminobenzene, -toluene, -anisole, -2-methoxy-5-methyl- or -2:5-dimethoxybenzene, for example methyl-, ethyl-, propyl- or butyl-ω-thiosulfuric acid ethylaminobenzene, 1-N-hydroxyethyl-ω-thiosulfuric acid ethylaminobenzene, 1-N-methoxyethyl-ω-thiosulfuric acid ethylaminobenzene, 1-N-cyanoethyl- or sulfatoethyl-ω-thiosulfuric acid ethylaminobenzene, as well as the corresponding compounds which contain as substituents in the nucleus alkyl-, especially methyl- or alkoxy-groups, halogen, acylamino-groups; for example 1-N-ethyl-ω-thiosulfuric acid ethylamino-3-methylbenzene, 1-N-butyl-ω-thiosulfuric acid ethylamino-3-methylbenzene, 1-N-ethyl - ω - thiosulfuric acid ethylamino-2-methyl-5-methyl- or acylaminobenzene, 1-N-butyl-ω-thiosulfuric acid ethylamino-2-methoxy-5-methyl- or -methoxy- or -acylaminobenzene. Further 1-N-hydroxyethyl- or 1-N-alkyl-hydroxyethyl- or 1-N-alkylhydroxyalkyl-, 1-N-cynoalkyl-, 1-N-sulfatoalkyl-, 1-N-aminoalkyl-ω-thiosulfuric acid ethylaminobenzenes, as well as their homologues containing individually or together alkyl-, hydroxyalkyl- or acylamino-groups as substituents. The dyestuffs then have the formula

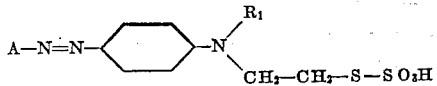

wherein A represents an aromatic radical substituted in any desired manner, and R₁ represents hydrogen or an alkyl radical also substituted in any desired manner. This radical may therefore represent alkyl, hydroxyalkyl, polyhydroxyalkyl, ethers and esters thereof with organic and inorganic acids. Among the products of which the alkylene radical which contains the thiosulfuric acid radical is substituted there may be named 1-N - alkyl-γ-thiosulfuric acid β - hydroxypropylaminobenzene, - toluene, - anisole, -cresol ether, for instance 1-N-ethyl-γ-thiosulfuric acid β-hydroxypropylamino-3-methylbenzene, 1-N-ethyl-γ-thiosulfuric acid β-hydroxypropylamino-2-methoxy-5-methylbenzene, 1-N-ethyl-γ-thiosulfuric acid β-hydroxypropylamino-2-methoxy-5-acetylaminobenzene, 1-N-hydroxyethyl- or -methoxyalkyl-γ-thiosulfuric acid β-hydroxypropylaminobenzene, -toluene, -anisole, -cresol ether or the like.

It is a question here in the first place of products of the general formula

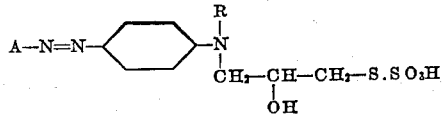

wherein A stands for an aromatic nucleus substituted in any desired manner, and R stands for hydrogen or an alkyl radical also substituted in any desired manner. These dyestuffs can be obtained by causing primary or secondary amines of the benzene series to react with epichlorohydrin, and treating the product with a salt, for example an alkali salt of the thiosulfuric acid, whereupon the intermediate product thus obtained is converted into dyestuffs by reaction with diazo compounds.

Mention is also made of that group of the new dyestuffs of which the alkylene—S—SO₃H radical is linked in a different manner, i. e. according to the following scheme:

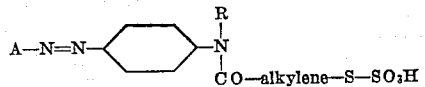

wherein A and R have the signification indicated above. These products can be obtained by treating azo-dyestuffs obtainable by coupling any desired diazo-compounds with primary or secondary amines, with such acidylating agents which contain a halogen atom capable of being exchanged and linked to an alkyl radical, for example with chloro-acetic acid-anhydride, chloroacetyl-chloride or β-chloro-propionic acid chloride. The acidylated amino-azo-dyestuffs thus produced can then be converted into the new dyestuffs of the above characterized formula by treating them with salts of the thiosulfuric acid, for example with sodium thiosulfate. If these compounds or the finished dyestuffs contain free amino-groups, they may, if desired, be diazotized on the fibre and coupled with any desired coupling component.

The dyestuffs obtainable by the invention may be soluble in water and are suitable especially for dyeing acetate artificial silk in aqueous solution; they are also useful for printing acetate artificial silk.

They may particularly be used in the form of their salts, for example in the form of their alkali salts or salts of ammonia.

Depending on the properties of these components, there may also be obtained dyestuffs which are suitable for dyeing and printing animal or vegetable fibre.

The following examples illustrate the invention, the parts being by weight:

*Example 1*

13.8 parts of 1-amino-4-nitrobenzene are diazotized in the usual manner with 6.9 parts of sodium nitrite in dilute hydrochloric acid with addition of crushed ice, and the diazo solution thus obtained is coupled with a solution of the sodium salt from 26.1 parts of N-ethyl-ω-thiosulfuric acid ethylaminobenzene obtainable for instance by causing N-(ethyl-ω-bromethyl)-aminobenzene to react with sodium thiosulfate in boiling aqueous acetone solution. The coupling is completed by the addition of sodium acetate, the separation of the dyestuff is completed by salting out and the solid matter is filtered and washed until neutral. The dyestuff thus obtained is, when dry, a brown powder soluble in organic solvents such as acetone or ethyl acetate and in water to a red solution. It has the formula:

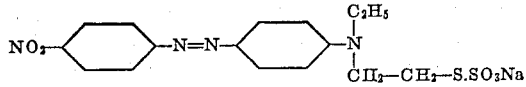

and dyes acetate artificial silk in aqueous solution in presence of Glaubers salt full scarlet tints. When reducing this dyestuff there is obtained a product of the formula

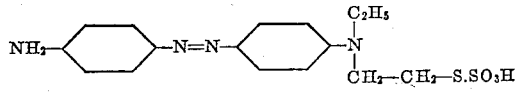

This dyestuff either in substance or diazotized or a substratum, may be converted into dyestuffs having different properties by treating it with components capable of being coupled, for example 2:3-hydroxynaphthoic acid, ethyl-β-naphthylamine or resorcine. If instead of N-ethyl-ω-thiosulfuric acid ethylaminobenzene there is used the equivalent quantity of N-ethyl-γ-thiosulfuric acid β-hydroxypropylaminobenzene, there is obtained a dyestuff of similar dyeing properties.

*Example 2*

A diazo solution made in the usual manner from 17.25 parts of 1-amino-2-chloro-4-nitrobenzene is coupled with a solution of sodium salt from 26.1 parts of N-ethyl-ω-thiosulfuric acid ethylaminobenzene. Coupling is completed by addition of sodium acetate, the separation of the dyestuff is completed by salting out and the solid matter is filtered and washed until neutral. The dyestuff thus obtained is a dark powder soluble in organic solvents such as acetone or ethyl acetate and in water to ruby red solutions. It has the formula:

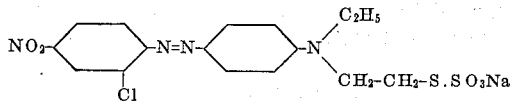

and dyes acetate artificial silk in aqueous solution in presence of sodium sulfate full ruby red tints.

A similar dyestuff is obtained when N-ethyl-γ-thiosulfuric acid β-hydroxypropylaminobenzene is used as the coupling component.

Instead of the 1-amino-2-chloro-4-nitrobenzene used in this example, there may also be used the diazo compound from 1-aminonaphthalene-4-sulfonic acid or from 1-aminobenzene-4-sulfonic acid. Such dyestuffs are then suitable also for dyeing wool or other animal fibers. These wool dyestuffs are obtained for example by diazotizing 1-aminonaphthalene-4-sulfonic acid and coupling with the reaction product from α-naphthylamine and epichlorohydrin, the chlorine atom being exchanged for the —S—SO₃H radical.

*Example 3*

18.3 parts of 1-amino-2:4-dinitrobenzene are diazotized in the usual manner in nitrosyl sulfuric acid, the sulfuric acid diazo solution thus obtained is poured into much ice water and this aqueous diazo solution is coupled with a solution of a sodium salt from 26.1 parts of N-ethyl-ω-thiosulfuric acid ethylaminobenzene. The coupling is completed by addition of sodium acetate and the dyestuff is salted out, filtered and washed until neutral. This dyestuff is a dark powder soluble in organic solvents such as acetone or ethyl acetate and in water to red violet solutions. It has the formula

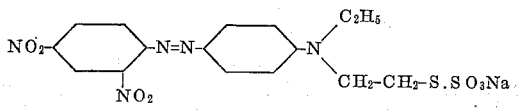

and dyes acetate artificial silk in aqueous solution in the presence of sodium sulfate red violet tints.

If this diazo compound is coupled with the reaction product from epichlorohydrin and α-naphthylamine which is treated with sodium thiosulfate, there is obtained the dyestuff of the formula

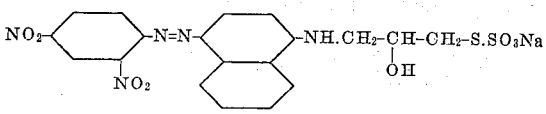

which dyes acetate artificial silk blue tints.

A similar dyestuff is obtained when N-ethyl-γ-thiosulfuric acid β-hydroxypropylaminobenzene is used as the coupling component. Dyestuffs which dye acetate artificial silk bluer tints are obtained when instead of the coupling components used in this example there are used coupling components which are substituted in the benzene nucleus. Dyestuffs of the following formulas are then obtained:

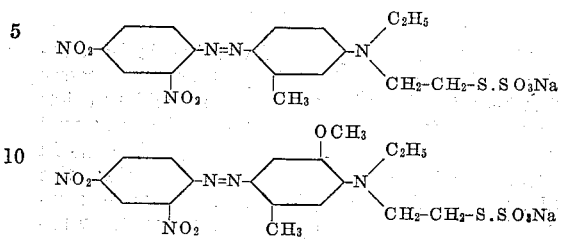

further also dyestuffs which have a substituted alkyl radical, such as for example dyestuffs of the formulas:

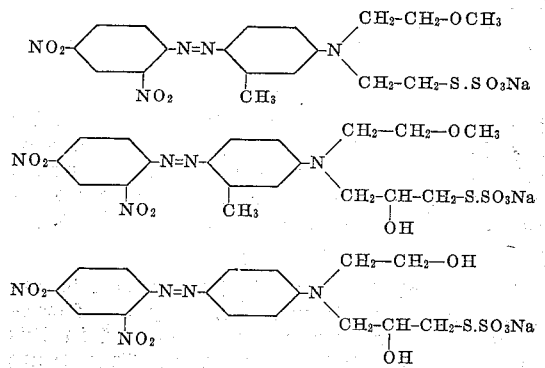

These dyestuffs are produced in quite an analogous manner.

*Example 4*

16.3 parts of 1-amino-2-cyano-4-nitrobenzene are diazotized in the usual manner in nitrosyl sulfuric acid and the diazo solution thus obtained is coupled with a solution of the sodium salt from 26.1 parts of N-ethyl-ω-thiosulfuric acid ethylaminobenzene in much ice water. Coupling is completed by addition of sodium acetate. The separation of the dyestuff is completed by salting out and the solid matter is filtered and washed until neutral. The dyestuff thus obtained is a dark powder soluble in organic solvents such as acetone or ethyl acetate and in water to violet solutions. It has the formula

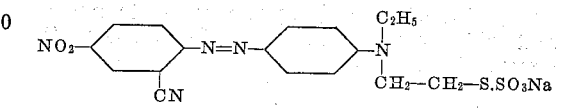

and dyes acetate artificial silk in aqueous solution in presence of sodium sulfate violet tints.

If instead of diazotized 1-amino-2-cyano-4-nitrobenzene the diazo-compound of 1-amino-4-nitro-2-phenylmethylsulfone, 1-amino-2:4-dinitro-6-halogen- or -cyano- or -methoxy- or -alkyl- or -hydroxybenzene or 1-amino-2:4-dinitro-6-phenylmethylsulfone or 1-amino-2-cyano-4-nitro-6-halogenbenzene or 1-amino-4-nitro-2:6-dichlorobenzene is used, there is obtained a dyestuff having similar dyeing properties which may be used, if desired, for printing acetate artificial silk or for dyeing acetate artificial silk in aqueous solution, the prints produced being of very various tints. This is also the case if the diazo compound mentioned in this example is replaced by the diazo compound of the 1-aminobenzene, 1-amino-4-methoxybenzene, 1-amino-4-chlorobenzene, 1-amino-2-chlorobenzene, 1-amino-4-acetylaminobenzene, 1-amino-2-nitrobenzene. These dyestuffs dye acetate artificial silk yellow to yellow orange tints. Thus, by suitable choice of the dyestuff the acetate artificial silk may be dyed or printed yellow, red, violet, blue or green tints.

Example 5

24.3 parts of the dyestuff obtainable by coupling diazotized 1-amino-4-methoxybenzene with 1-amino-3-hydroxybenzene in acid solution are chloracetylated in boiling glacial acetic acid by means of 11.3 parts of chloracetyl chloride in presence of anhydrous sodium acetate; the chloracetylamino-dyestuff thus obtained is converted into the thiosulfuric acid compound by reaction with sodium thiosulfate in boiling aqueous acetone solution. The acetone is removed in a vacuum and the water-soluble dyestuff of the formula

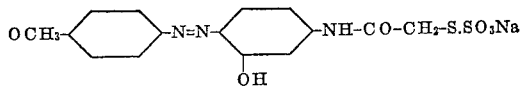

is salted out. When dry it is a yellow powder soluble in organic solvents such as acetone or ethyl acetate and in water to yellow solutions and dyes acetate artificial silk in aqueous solution in presence of Glaubers salt yellow tints.

Example 6

0.5 part of the dyestuff of Example 1 is dissolved in 3000 parts of water. 40 parts of crystallized sodium sulfate are added and in this bath 100 parts of acetate artificial silk yarn are treated for one hour at 80° C. After rinsing and drying the acetate artificial silk is colored pure and scarlet red.

Depending on the choice of the dyestuff, acetate artificial silk may be dyed very various tints.

What we claim is:

1. Monoazo-dyestuffs containing at least once in the dyestuff molecule the grouping

wherein X stands for a member of the group consisting of -alkylene-S.SO₃H and -hydroxyalkylene-S.SO₃H and R₁ stands for a member of the group consisting of hydrogen and alkyl.

2. Azo-dyestuffs which are free from sulfo groups linked directly to the aromatic nucleus and which correspond in the free state to the general formula

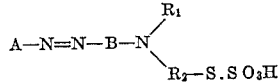

wherein A and B stand for nuclei selected from the group consisting of nuclei of the benzene and naphthalene series, R₁ stands for a member of the group consisting of hydrogen and alkyl radicals, and R₂ stands for an alkylene of low molecular weight, which dyestuffs form powders which dissolve in water to yellow, to orange, to red, to brown, to violet and to blue solutions and dye textiles the same tints.

3. Monoazo-dyestuffs which are free from nuclear sulpho groups and which correspond in the free state to the general formula

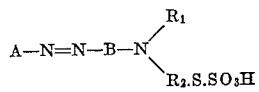

wherein A and B stand for nuclei of the benzene series, R₁ stands for a member of the group consisting of hydrogen and alkyl, and R₂ stands for a member of the group consisting of alkylene and hydroxyalkylene, and wherein the azo-group and the

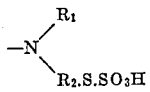

group are in para position relative to each other.

4. Monoazo-dyestuffs which are free from nuclear sulpho groups and which correspond in the free state to the general formula

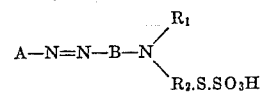

wherein A stands for a benzene nucleus having a nitro-group in para position to the azo-group and B is a nucleus of the benzene series, R₁ stands for a member of the group consisting of hydrogen and alkyl, and R₂ stands for a member of the group consisting of alkylene and hydroxyalkylene, and wherein the azo-group and the

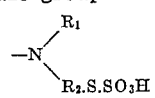

group are in para position relative to each other.

5. Monoazo-dyestuffs which are free from nuclear sulpho groups and which correspond in the free state to the general formula

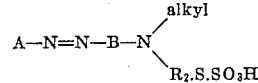

wherein A stands for a benzene nucleus having a nitro-group in para position to the azo-group and B is a nucleus of the benzene series, and R₂ stands for a member of the group consisting of alkylene and hydroxyalkylene, and wherein the azo-group and the

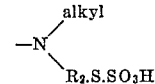

group are in para position relative to each other.

6. Monoazo-dyestuffs which are free from nuclear sulpho groups and which correspond in the free state to the general formula

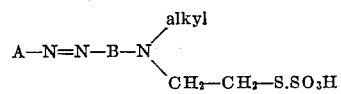

wherein A is a radical of the benzene series containing the nitro group in 2-position and B is a radical of the benzene series, and wherein the azo-group and the

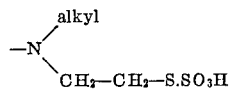

group are in para position relative to each other.

7. Azo-dyestuffs which are free from nuclear sulpho groups and which correspond in the free state to the general formula:

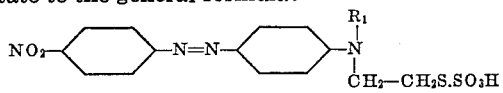

wherein R₁ stands for a member of the group consisting of hydrogen and alkyl.

8. Process of dyeing cellulose acetate which comprises applying thereto a dye of the formula:

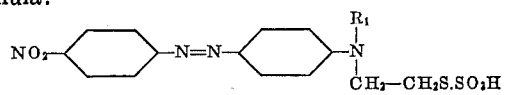

wherein $R_1$ stands for a member of the group consisting of hydrogen and alkyl.

9. Monoazo-dyestuffs of the general formula

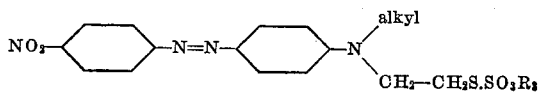

wherein $R_3$ stands for a member of the group consisting of H and Na.

10. The azo-dyestuff which corresponds in the free state to the formula

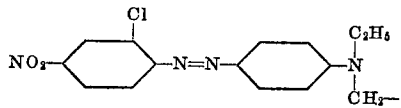

which dyestuff is a brown powder dissolving in water to brown solutions and dyeing textiles brown tints.

11. The azo-dyestuff which corresponds in the free state to the formula

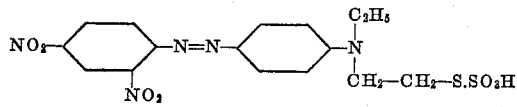

which dyestuff is a dark powder dissolving in water to violet solutions and dyeing textiles violet tints.

FRIEDRICH FELIX.
WILHELM HUBER.